US006297501B1

(12) United States Patent
Merren

(10) Patent No.: US 6,297,501 B1
(45) Date of Patent: Oct. 2, 2001

(54) SIMULTANEOUS DETECTION ISOTOPIC RATIO MASS SPECTROMETER

(75) Inventor: Thomas O. Merren, Altrincham (GB)

(73) Assignee: Micromass Limited, Manchester (GB)

( * ) Notice: Subject to any disclaimer, the term of this patent is extended or adjusted under 35 U.S.C. 154(b) by 0 days.

(21) Appl. No.: 09/294,448

(22) Filed: Apr. 19, 1999

(30) Foreign Application Priority Data

Apr. 20, 1998 (GB) .................................................. 9808319

(51) Int. Cl.[7] ............................. H01J 49/32; B01D 59/48

(52) U.S. Cl. ........................... 250/296; 250/282; 250/283

(58) Field of Search .................................... 250/296, 281, 250/282, 283, 294

(56) References Cited

U.S. PATENT DOCUMENTS

| | | | | |
|---|---|---|---|---|
| 3,522,428 | | 8/1970 | Powers | 250/41.9 |
| 5,043,575 | * | 8/1991 | Habfast et al. | 250/283 |
| 5,166,518 | * | 11/1992 | Freedman | 250/296 |
| 5,180,913 | * | 1/1993 | Laue | 250/281 |
| 5,220,167 | | 6/1993 | Brown et al. | 250/281 |
| 5,545,894 | | 8/1996 | Funsten et al. | 250/281 |
| 5,621,209 | * | 4/1997 | Purser | 250/296 |

FOREIGN PATENT DOCUMENTS

| | | | |
|---|---|---|---|
| 39 28 836 A1 | 8/1989 | (DE) . | |
| 2 230 896 A | 2/1990 | (GB) . | |
| 03-269944 | 12/1991 | (JP) | H01J/49/28 |
| 04-32145 | 2/1992 | (JP) | H01J/49/06 |
| 04-32146 | 2/1992 | (JP) | H01J/49/06 |
| 04-32147 | 2/1992 | (JP) | H01J/49/06 |
| WO 97/1594 | 5/1997 | (WO) | H01J/49/02 |

OTHER PUBLICATIONS

Stacey, Sherrill et al, Int. J. Mass Spectrom. and Ion Phys., 1981, vol. 39, pp. 167–180.

Wolnik, Int. J. Mass Spectrom. and Ion Phys., 1979, vol. 30, pp. 137–154.

Prosser, Int. J. Mass Spectrom. and Ion Proc., 1993, vol. 125 (2–3) pp. 241–266.

Prosser and Scrimgeour, Anal. Chem., 1995, vol. 167, pp. 1992–1997.

Kaiser, Stevens, Argonne Nat. Laboratory Report ANL7393 (Nov. 1967).

Merrill, Calkins et al, 27$^{th}$ Ann. Conf. on Mass Spectrom. and Allied Topics, Seattle, Jun 1979, pp. 334–335.

Freeman, Daly, Powell, Rev. Sci. Instrum., 1967, vol. 38 (7), pp. 945–948.

(List continued on next page.)

*Primary Examiner*—Jack Berman
(74) *Attorney, Agent, or Firm*—Alix, Yale & Ristas, LLP

(57) ABSTRACT

The invention comprises a mass spectrometer 1 and a method of mass spectrometry that is especially useful for the measurement of the isotopic composition of hydrogen in the presence of a helium carrier gas. Interference to the accurate measurement of the small $HD^+$ peak at mass-to-charge ratio 3 by the much larger $He^+$ peak at mass-to-charge ratio 4 is reduced by provision of an energy filter 35 in the ion detector assembly used to collect $HD^+$ ions. This prevents ions of $He^+$ which have lost energy through scattering, etc giving rise to a signal from the $HD^+$ detector and distorting the deuterium hydrogen isotopic ratio measurement. Such a mass spectrometer 1 is typically used in conjunction with a continuous flow inlet system 4 based on an elemental analyzer that converts hydrogen present in a sample to gaseous hydrogen in a flow of helium carrier gas. Another embodiment of the invention provides a similar mass spectrometer useful for carbon or oxygen isotopic determinations in carbon dioxide gas.

18 Claims, 3 Drawing Sheets

OTHER PUBLICATIONS

White, Rourke, Sheffield, Appld. Spectros., 1958, vol. 2, pp. 46–52.

Zhang, Nucl. Instrum. Methods In Phys. Res., 1987, vol. B26, pp. 377–380.

Ferguson, Chastagner, Int. J. Mass Spectrom. and Ion Phys., 1977, vol. 24, pp. 403–412.

Brunee Laser et al, 25th Ann. Conf. on Mass Spectrom. and Applied Topics, May 1977, Washington DC, pp. 95–96.

Freeman, Daly, Powell; 15th Ann. Conf. of Mass Spectrometry and Allied Topics, May 1967, Renver, p. 406.

Turner, VG Isotopes Publicity Brochure, "Multicollection in Thermal Ionization Mass Spectrometry", Published 1982.

Freeman, Daly; J. Sci. Instrum., 1967, vol. 44, pp. 956–958.

* cited by examiner-

SIMULTANEOUS DETECTION ISOTOPIC RATIO MASS SPECTROMETER

BACKGROUND OF THE INVENTION

This invention relates to a magnetic sector mass spectrometer that is capable of simultaneously detecting two or more mass dispersed ion beams, and which is particularly useful for the determination of isotopic composition of elements of low atomic mass, for example hydrogen, carbon and oxygen.

The accurate determination of isotopic composition by mass spectrometry is usually carried out by means of a magnetic sector mass analyzer that has a plurality of collectors disposed along its mass-dispersed focal plane. In such a spectrometer each collector is positioned to receive only ions of a given mass-to-charge ratio and is provided with means for reading out the number of ions which it receives during a given time period. Consequently, the ratio of the signals generated by the arrival of several ion beams of different mass-to-charge ratio is unaffected by variations in parameters such as the sample flow rate into the ionization source and the ion source efficiency which affect both beams equally, so that, for example, the isotopic composition of an element in a sample can be determined very accurately. An example of a conventional multi-collector array for a magnetic sector mass spectrometer is given by Stacey, et. al. in Int. J. Mass Spectrom. and Ion Phys. 1981 vol 39 pp 167–180.

In the case when an isotope is present only in a small proportion relative to another isotope having an adjacent mass-to-charge ratio, the property known as abundance sensitivity of the mass spectrometer becomes critically important. Abundance sensitivity is a measure of an interfering signal at any given mass-to-charge ratio M due to the presence of a larger signal at M±1. Unless special precautions are taken the larger peak typically has a "tail", usually greatest on the low mass side of the peak, which often extends to adjacent masses and causes an uncertainty in the true zero of the signal at that mass.

A major cause of the low mass tail is thought to be scattering of the ions composed in the major peak due to collisions with neutral gas molecules in the spectrometer housing. Typically these collisions result in a loss in energy so that the ions that have undergone them appear on the low mass side of the true position on the mass-to-charge axis of a resultant spectrum.

Various arrangements are known to improve the abundance sensitivity of a spectrometer. Firstly, the ion optical arrangements of the analyzer, such as the magnetic sector angle, poleface inclination and curvature and the positions and sizes of the entrance and exit slits can be selected to produce high dispersion to minimise the overlap at the detector between beams comprising ions which differ in mass-to-charge ratio of 1 unit. Examples of this approach include Wollnik, Int. J. Mass Spectrom. and Ion Phys. 1979 vol 30 pp 137–154, Prosser, Int J. Mass Spectrom. and Ion Proc. 1993 vol 125 (2–3) pp 241–266 and Prosser and Scrimegour, Anal. Chem. 1995 vol 67 pp 1992–1997. This approach can be successfully adopted with a simultaneous collection spectrometer, but increasing mass dispersion does not necessarily improve the abundance sensitivity as it may merely result in the centroids of adjacent mass peaks being spaced further apart while the width of the peaks is correspondingly increased. An alternative approach is to provide an electrostatic lens or retarding electrode arrangement between the exit aperture of the analyzer and the detector itself. This electrode may be biased so that it provides a potential barrier which ions must surmount to reach the detector. If correctly set, ions which have lost energy and which are therefore comprised in the unwanted low mass tail of a peak will have insufficient energy to surmount the barrier and will be prevented from reaching the detector. Such devices are taught by Kaiser and Stevens, Report No ANL-7393 of Argonne National Laboratory (Pub. November 1997), Merrill, Collins and Peterson, $27^{th}$ An. Confr. on Mass Spectrometry and Allied Topics, June 1979, Seattle, pp 334, Freeman, Daly and Powell in Rev. Sci. Instrum. 1967 vol 38 (7) pp 945–948. This method has not typically been applied to simultaneous collection mass analyzers because the retardation of the wanted ions as they surmount the potential barrier amplifies the relative contribution of any component of velocity they may have perpendicular to their direction of travel and can actually result in a greater overlap between adjacent mass peaks.

An improvement on the provision of a retarding electrode is the use of an energy analyzing device between a magnetic sector analyzer and the ion detector. The three-stage mass spectrometer of White, Rourke and Sheffield described in Appld. Spectroscopy 1958 (2) pp 46–52 comprised two magnetic sector analyzers followed by an electrostatic energy analyzer and was intended to provide improved abundance sensitivity. However, the restriction imposed on the extent of the mass-to-charge focal plane by the final electrostatic analyzer precluded the use of a multicollector detector at this location. Instead, the "low mass" ion beam was deflected into an auxiliary electron multiplier as it left the second magnetic sector and only the high mass ion beam entered the energy analyzer. Thus, when used for its intended purpose of the isotopic analysis of uranium, the $^{238}U$ ion beam would pass into the energy analyzer and the $^{235}U$ beam would be intercepted after the second magnet. As the $^{238}U$ beam was 140× more intense than the $^{235}U$ beam in the examples given, the presence of the energy analyzer does not prevent $^{238}U$ ions which have lost energy striking the $^{235}U$ collector because the collector is situated upstream of the energy analyzer. This prior art therefore teaches that an energy filter should be used to filter the most abundant ion beam, but as the authors make clear, when used in the simultaneous collection mode the improvement in abundance sensitivity arises from the presence of the two magnetic sector analyzers and not from the electrostatic analyzer. It is clear that energy filtration of the most intense ion beam subsequent to it passing the collector used for the less abundant beam can have no effect on the interference to the signal at that collector from ions in the most abundant beam that have lost energy.

An isotopic-ratio multicollector spectrometer having a 90° spherical sector energy analyzer is described by Zhang in Nucl. Instrum. and Methods in Phys. Research 1987 vol B26 pp 377–380. This instrument is similar to that described by White, Rourke and Sheffield in that the energy filter is arranged to filter the highest mass ion beam only (ie, the $^{238}U$ beam in the example given) while collectors for other ion beams are disposed before the entrance slit of the energy analyzer in such a way that they intercept only lower mass ion beams. Consequently, as in the earlier instrument, if used in a simultaneous collection mode this instrument cannot reduce interference to the less abundant $^{235}U$, $^{236}U$ and $^{237}U$ beams. The example given suggests that to obtain an improvement in abundance sensitivity the instrument is used in a conventional single-collector mode and the magnetic field is scanned.

U.S. Pat. No. 5,220,167 and International Application WO 97/15944 teach use of an electrostatic lens disposed between the exit of a magnetic sector mass analyzer and an array of collectors in an isotopic ratio mass spectrometer in order to increase the separation between beams of different mass-to-charge ratios at the detector. Such an arrangement does not improve the abundance sensitivity, as explained above.

GB patent application 2230896 teaches the disposition of a retarding lens and a quadrupole mass filter to receive one of the ion beams in a simultaneous collection mass spectrometer to eliminate ions of different mass-to-charge ratios which have lost energy due to scattering from that beam. U.S. Pat. No. 5,545,894 describes a hydrogen isotopic ratio mass spectrometer in which isobaric interferences are reduced by passing ions of hydrogen, deuterium, tritium and helium into a detection device which comprises a thin foil through which the ions must pass. Atomic ions of H, D, and T exit the foil as negative ions and may be separated by scanning an electrostatic energy analyzer disposed downstream of the foil.

SUMMARY OF THE INVENTION

It is an object of the present invention to provide a simultaneous collection isotopic ratio mass spectrometer that has higher abundance sensitivity than prior types of similar size and cost. It is another object to provide such a mass spectrometer suitable for the determination of hydrogen isotopic ratios in the presence of helium gas. It is another object of the invention to provide methods of determining isotopic composition using such a simultaneous collection mass spectrometer, and still another object to provide improved methods of determining the isotopic composition of hydrogen in the presence of helium gas.

In accordance with these objectives there is provided an isotopic-ratio multiple-collector mass spectrometer comprising:

a) an ionization source for generating from a sample ions having an initial kinetic energy;

b) a magnetic sector analyzer that disperses said ions according to their momentum into a plurality of ion beams each of which substantially comprises ions of a different mass-to-charge ratio, and focuses each of said beams to different position in a focal plane, wherein in use said plurality of beams comprises at least a first ion beam and a second ion beam that is more intensive than said first ion beam;

c) first ion detection means disposed in said focal plane to receive ions of a first mass-to-charge ratio comprised in said first ion beam;

d) second ion detection means disposed in said focal plane to receive ions of a second mass-to-charge ratio comprised in another of said plurality of ion beams, other than said first ion beam; and e) means for determining from signals generated by said first and said second ion detection means the ratio of the number of ions having said first mass-to-charge ratio to the number of ions having said second mass-to-charge ratio;

said mass spectrometer characterized in that said first ion detection means comprises an ion-energy filter that allows only ions having substantially said initial kinetic energy to pass to a collection electrode and thereby to generate said signal from said first ion detection means.

In a preferred embodiment, the spectrometer is adapted for the determination of hydrogen isotope ratios in the presence of helium gas. In this embodiment the first ion beam may comprise the minor isotope $HD^+$ (mass-to-charge ratio 3) and the second, more intense, ion beam comprises the $He^+$ ions (mass-to-charge ratio 4) which are not to be determined but are unavoidably generated in the ion source. Preferably, a beam stop is provided in the path of the second ion beam to discharge the $He^+$ Ions. The second ion detection means is disposed to receive the major isotope $H_2^+$ at mass-to-charge ratio 2. According to the invention an energy filter is provided in the first ion detection means which is disposed to receive ions of mass-to-charge ratio 3 so that only ions having approximately the initial kinetic energy at which they are formed in the ion source will reach a collector electrode and generate a signal. This arrangement largely eliminates the interference to the signal at mass-to-charge ratio 3 which would otherwise result from $He^+$ ions (mass-to-charge ratio 4) which have lost energy through collisions with neutral gas molecules during their journey from the ion source to the focal plane; such ions may enter the first ion detection means at mass-to-charge 3 rather than pass through the focal plane at the mass-to-charge ratio 4 position, so that the abundance sensitivity of the spectrometer at mass-to-charge ratio 3 is improved by preventing these ions reaching the collection electrode.

In another preferred embodiment a spectrometer of the invention further comprises an inlet system capable of generating gaseous samples of hydrogen, HD and deuterium from a solid or liquid sample, for example the arrangement taught in European Patent No EP 0419167 B1. Such a continuous flow introduction system unavoidably introduces large quantities of helium gas into the ion source and in a conventional mass spectrometer the accuracy of the $HD/H_2$ isotope ratio determined may be impaired due to the detection of scattered $He^+$ ions by the $HD^+$ detector. However, the improved abundance sensitivity of a spectrometer according to the invention results in a substantial reduction in the interference to the very small signal at mass-to-charge ratio 3 due to $HD^+$ from scattered $He^+$ ions and improves the accuracy of the $HD^+/H_2^+$ ratio determination.

In another preferred embodiment the spectrometer may comprise additional ion detection means disposed to receive other minor isotope beams, and at least some of these may comprise energy filters similar to that employed in the first ion detection means. Typically the second ion detection means receives the major isotope beam and does not require an energy filter, but the provision of one is not excluded. This embodiment is especially useful if the spectrometer is adapted to monitor oxygen or carbon isotopic ratios from gaseous samples of carbon dioxide introduced into the ion source. In conventional multi-collector mass spectrometers intended for this purpose, scattered ions from the major isotope beam at mass-to-charge ratio 44 ($CO_2^+$) can reduce the accuracy of the minor beams at mass-to-charge ratios 45 and 46. The spectrometer according to the invention can be adapted to overcome this problem by arranging the first detection means to receive ions of mass-to-charge ratio 45, another ion detection means having an energy filter similar to that used in the first detection means to receive ions of mass-to-charge ratio 46, and the second ion detection means (without an energy filter) to receive the second beam, that is, the major isotope at mass-to-charge ratio 44. Clearly, in such an embodiment, a beam stop is not provided in the path of the second ion beam.

It will be appreciated that a spectrometer according to the invention can be adapted to determine the isotopic composition of a wide range of different elemental species by using ion detection means fitted with an energy filter to receive minor isotope beams in the presence of intense ion beams at adjacent masses which would reduce the accuracy of the minor isotope intensity measurement in prior spectrometers. The invention improves the abundance sensitivity of the spectrometer with respect to those minor isotope beams adjacent to more intense beams irrespective of whether or not the more intense beam is actually determined.

The invention overcomes the limitation on the extent of the mass-dispersed focal plane, and hence the number of ion beams that can be simultaneously monitored, imposed by the energy filter of the prior spectrometer described above because each filter is required to transmit only ions of one particular mass-to-charge ratio.

Preferably the energy filter comprised in the first detector comprising a small cylindrical sector analyzer which focuses ions having the correct initial ion energy into a collector electrode which comprises a Faraday bucket of the type conventionally employed in the isotopic-ratio multi-collector mass spectrometer. Other types of energy filters may also be employed, however.

Viewed from another aspect the invention provides a method of determining isotopic composition using a multiple-collector mass spectrometer comprising the steps of:

a) generating from a sample ions which have an initial kinetic energy;

b) dispersing said ions according to their momentum by means of a magnetic sector analyzer, thereby producing a plurality of ion beams each of which substantially comprises ions of a different mass-to-charge ratio, and focusing each of said plurality of ion beams to a different position in a focal plane, wherein in use said plurality of ion beams comprises at least a first ion beam and a second ion beam that is more intense than said first ion beam;

c) receiving ions comprised in said first ion beam that have said initial kinetic energy and a first mass-to-charge ratio comprised in said first ion beam in first ion detection means disposed in said focal plane;

d) receiving ions comprised in another of said plurality of ion beams (other than said first ion beam) that have said initial kinetic energy and a second mass-to-charge ratio comprised in another of said plurality of ion beams (other than said first ion beam) in second ion detection means disposed in said focal plane; and e) determining from signals generated by said first and second ion detection means the ratio of the number of ions having said first mass-to-charge ratio to the number of ions having said second mass-to-charge ratio;

said method characterized by the additional step of energy filtering the ions after they have entered said first ion detection means to allow only ions having said initial kinetic energy to reach a collection electrode and generate said signal from said first ion detection means.

A preferred method is a method as described above wherein hydrogen isotopic ratios are determined in the presence of helium gas. In this preferred method the first ion beam comprises $HD^+$, the second ion beam comprises $He^+$ and the second ion detection means is disposed to receive the major isotopic component $H_2^+$. The second ion beam is preferably intercepted by a beam stop disposed in its path. In a further preferred method, a continuous flow of a gaseous hydrogen and HD is generated from a sample in a flow of Helium carrier gas, for example by the method taught in European Patent No 0419167 B1.

In a further preferred method, one or more additional ion detection means may be provided and ions entering at least some of those additional detection means may be energy filtered so that only ions having approximately the initial ion energy reach a collector electrode and generate the signal from them. This method is particularly applicable to the determination of carbon or oxygen isotopic ratios from samples of carbon dioxide gas. In such a determination the first and a third ion detection means are fitted with energy filters and are used to detect ions having mass-to-charge ratios of 45 and 46 respectively, and the second beam comprises ions of the major isotope at mass-to-charge ratio 44. The second ion detection means, without an energy filter, is used to measure the second ion beam, and obviously the second ion beam is not intercepted by a beam stop.

In further preferred methods the ions entering the first ion detection means are energy filtered by passing them through a cylindrical sector electrostatic energy analyzer which focuses those ions having approximately the initial ion energy into a collector electrode which comprises a Faraday bucket of the type conventionally employed in isotopic ratio multi-collector mass spectrometers.

BRIEF DESCRIPTION OF THE DRAWINGS

Preferred embodiments of the invention, given by way of example only, will now be described in greater detail with reference to the figures, wherein.

DETAILED DESCRIPTION OF THE PREFERRED EMBODIMENTS

Figure 1:
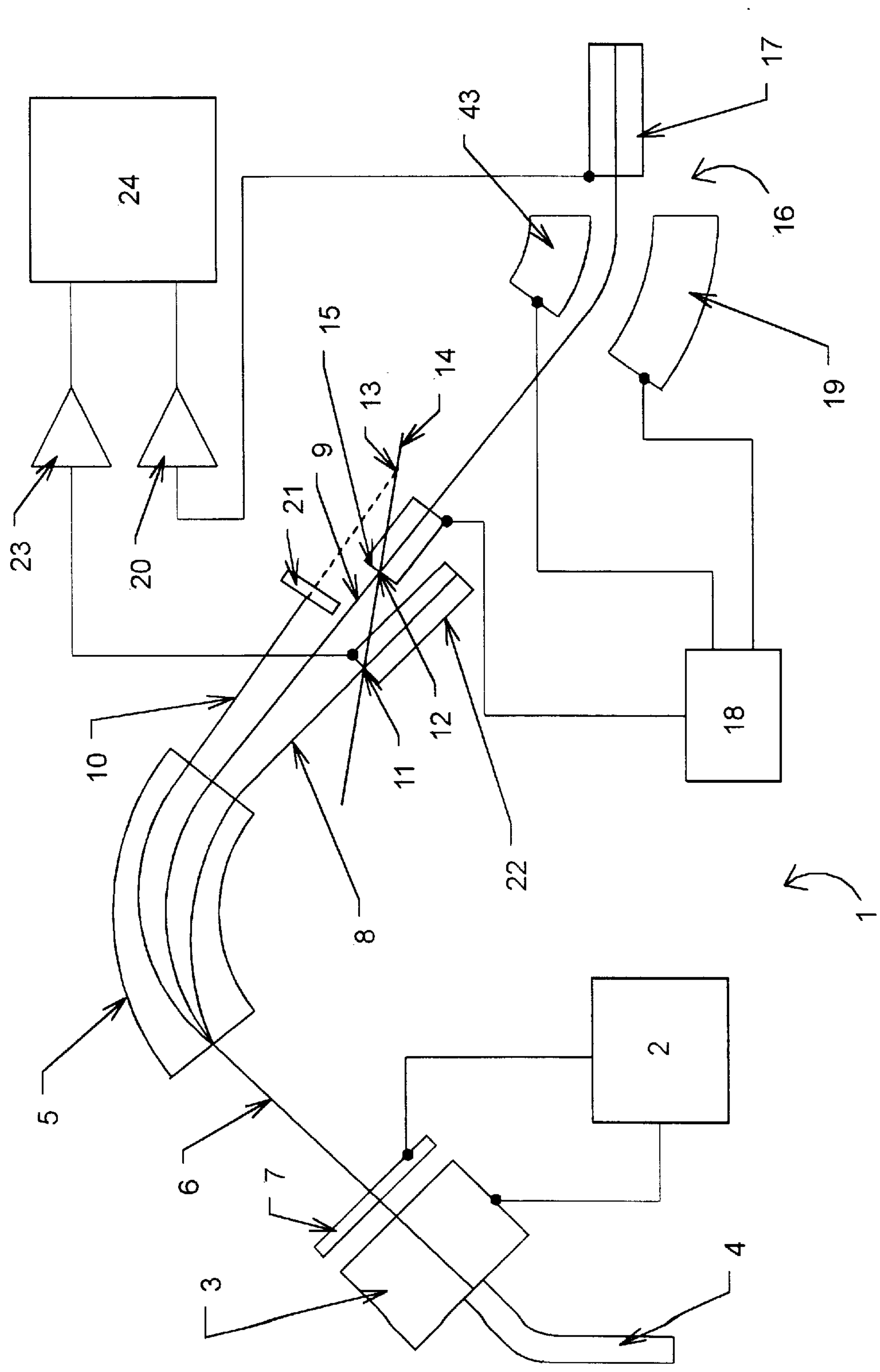
FIG. 1 is a schematic drawing of a mass spectrometer according to the invention suitable for the determination of hydrogen isotopic ratios in the presence of helium.

Referring first to FIG. 1, an isotopic-ratio multi-collector mass spectrometer generally indicated by 1 comprises a vacuum housing (not shown) and an ion source 3 for generating positive ions from a sample. A gaseous sample comprising hydrogen isotopes in an excess of helium carrier gas is introduced into the ion source 3 through the inlet pipe 4. A magnetic sector analyzer 5 receives the ion beam 6 produced by the ion source 3 which comprises ions having an initial energy determined by the potential maintained between the ion source 3 and an analyzer entrance slit 7. A power supply 2 maintains a potential difference (typically about 4 kV) between the ion source 3 and the entrance slit 7. The magnetic sector analyzer 5 disperses the ions in the beam 6 according to their mass-to-charge ratios and produces a plurality of beams 8, 9, and 10 comprising ions of mass-to-charge ratios 2, 3 and 4 respectively. These are focused by the analyzer 5 at different positions (11, 12, 13 respectively) in the focal plane 14 of the analyzer.

A first ion beam 9 comprising ions of mass-to-charge ratio 3 ($HD^+$) is focused at position 12 on focal plane 14 and enters a first ion detection means comprising a detector entrance slit 15, an energy filter 16 and a collection electrode 17. The energy filter 16 comprises a pair of cylindrical electrodes 19, 43 maintained respectively positive and negative with respect to the potential of detector entrance slit 15 by means of a power supply 18, as in a conventional cylindrical sector analyzer. The radius and sector angle of the filter 16, and the potentials applied to the electrodes 19 and 43, are selected to deflect ions having the correct initial ion energy that pass through the detector entrance slit 15 into the collection electrode 17. The collection electrode 17 preferably comprises a conventional Faraday bucket collector of the type conventionally employed in multiple-collector mass spectrometers, for example those taught in European Patent Application No 0762472 A1. The filter 16 is also arranged so that an ionic image of the detector entrance slit 15 is created on the collection electrode 17 as a result of its focusing action.

Ions that strike the collection electrode 17 generate an electrical current that flows through the input resistance of an amplifier 20 to generate a signal from the first ion detection means.

The energy filter 16 prevents ions that have lost energy since their formation (as a consequence of collisions with neutral gas molecules) from reaching the collection electrode 17 even when they have passed through the detector entrance slit 15. The trajectory through the energy filter 16 of these ions will have a smaller radius so that the ions will either strike the inner electrode of the filter or will exit in such a way that they do not strike the collection electrode 17. Typically these ions will be scattered $He^+$ ions, present in large numbers, which because of their low energy are deflected along a smaller radius trajectory in the magnetic sector analyzer 5 than ions of the correct energy and pass through the detector entrance slit 15 instead of being confined in the second beam 10 which does not pass through slit 15. Consequently, the interference to the small signal representing $HD^+$ from the scattered helium ions is greatly reduced (that is, the abundance sensitivity is improved) in comparison with a similar sized conventional mass spectrometer.

As explained, in this embodiment the $He^+$ ions (mass-to-charge ratio 4) exit from the magnetic sector analyzer 5 in the second beam 10 which is intercepted by a beam stop 21. $H_2^+$ ions at mass-to-charge ratio 2 exit from the magnetic sector analyzer 5 in the beam 8 and are received by a second ion detection means 22 disposed in the focal plane 14 at position 11. Because this beam is invariably far more intense than the $HD^+$ beam 9, and is separated from the $He^+$ beam 10 by a greater distance, it is unnecessary to provide an energy filter and the detector 22 comprises only a conventional Faraday bucket collector. An amplifier 23 amplifies the signal generated by the detector 22.

A digital computer 24 with a suitable input device receives the signals from the two amplifiers 20 and 23 (which represent the ion intensities of the $HD^+$ and $H_2^+$ ions respectively) and determines their ratio, thereby providing an accurate measurement of the ratio of H and D in the sample gas. As in a conventional isotopic ratio spectrometer, a reference sample may be introduced into the ion source alternately with the sample to calibrate the system and provide a highly accurate determination.

Figure 3:
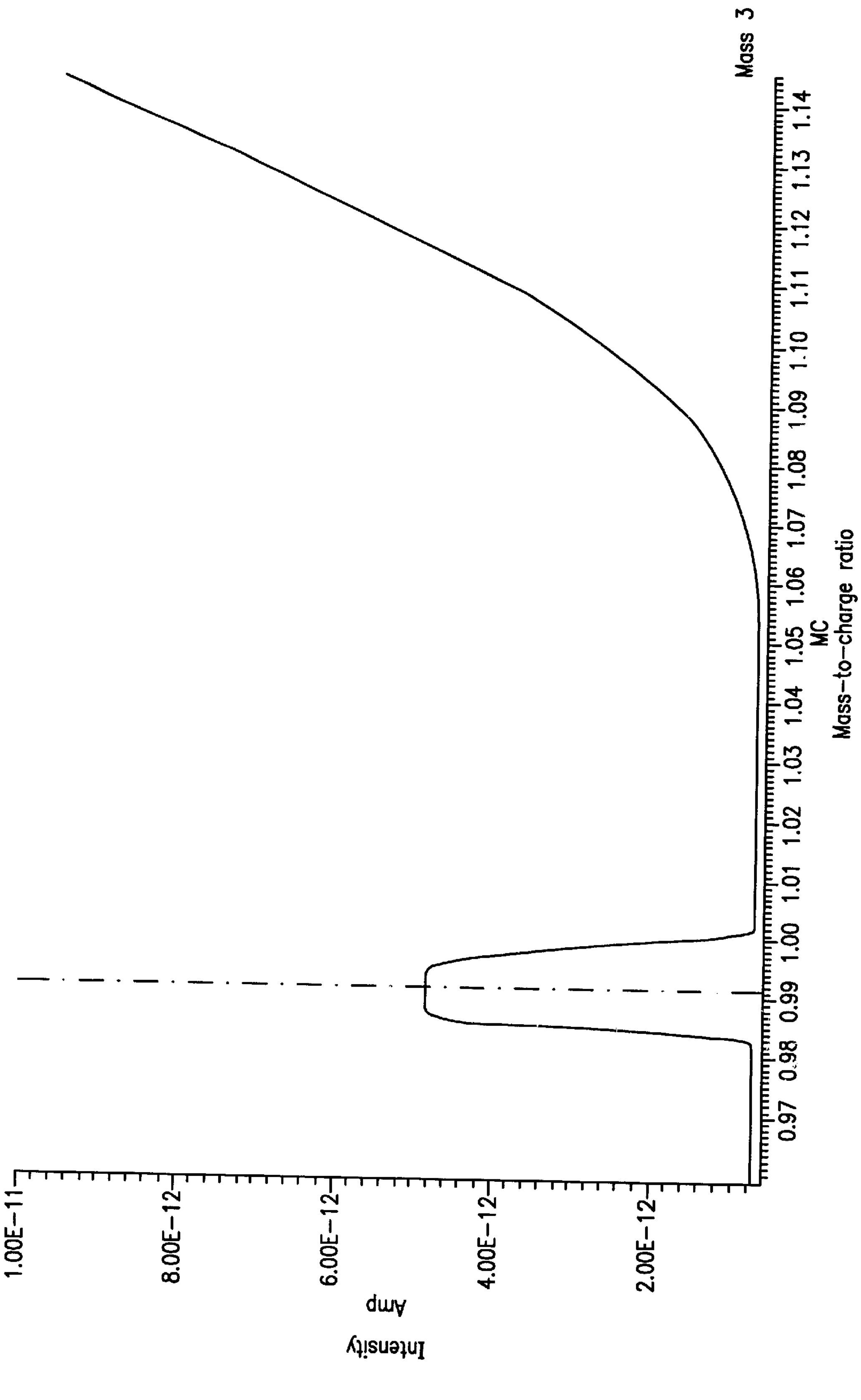
FIG. 3 is part of a scanned mass spectrum obtained with apparatus according to FIG. 1 illustrating the abundance sensitivity of that apparatus.

FIG. 3 illustrates the effectiveness of the invention in improving the abundance sensitivity of the spectrometer in relation to the $HD^+$ peak. In FIG. 3 the vertical axis represents the signal generated by the first ion detection means (15, 16, 17 FIG. 1) and the horizontal axis is the magnetic field strength of the analyzer 5. The spectrum was obtained by scanning the field strength so that the beam of ions of mass-to-charge ratio 3 was scanned across the detector entrance slit 15. Peak 25 represents the $HD^+$ ions, while the very large peak 26 is part of the $He^+$ peak at mass-to-charge ratio 4, for a typical sample introduced into the source. It is clear that a complete baseline separation exists between the peaks, despite the size of the $He^+$ peak.

Figure 2:
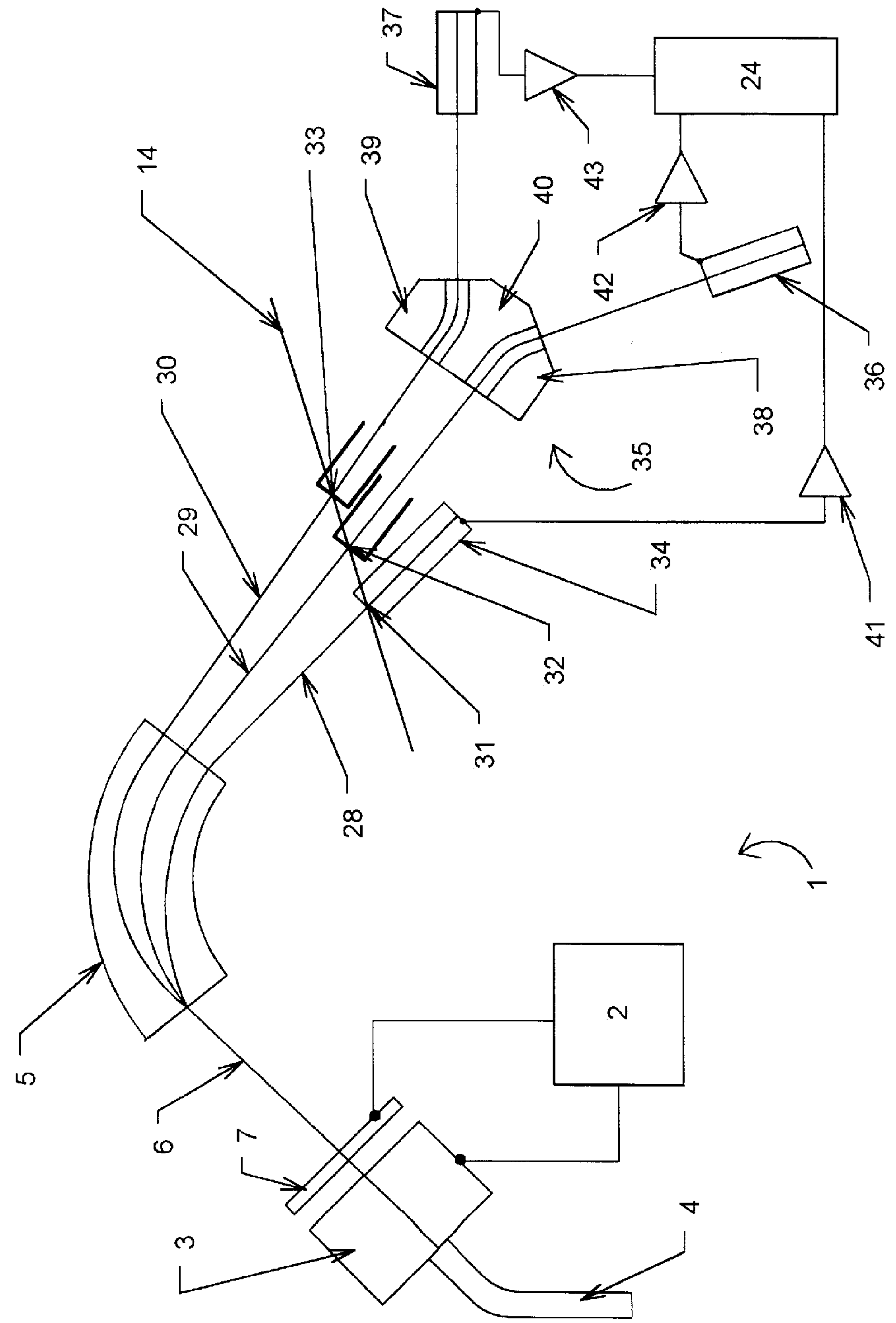
FIG. 2 is a schematic drawing of a mass spectrometer according to the invention suitable for the determination of the isotopic composition of carbon dioxide.

Referring next to FIG. 2, a spectrometer 27 according to the invention suitable for the determination of the isotopic composition of carbon dioxide is illustrated. Three ion detection means are provided to simultaneously monitor the major isotope at mass-to-charge ratio 44 and the two minor isotopes at mass-to-charge ratios 45 and 46. The magnetic sector analyzer 5 generates three beams 28, 29, 30 which are focussed at points 31, 32 and 33 in the focal plane 14 as illustrated. Beams 28, 29, 30 comprise ions of mass-to-charge ratio 44, 45 or 46 respectively. The most intense beam 28 (the second beam) is received in the second ion detection means 34 which comprises a conventional Faraday bucket while the first ion detection means receives the minor beam 29 and comprises an entrance slit located at point 33, an energy filter 35 and a collection electrode 36. The other minor isotope beam 30 is received in a third ion detection means comprising a detector entrance slit at point 33, a second analysing channel in the energy analyzer 35, and another collection electrode 37. As in the FIG. 1 embodiment the collection electrodes 36 and 37 may comprise conventional Faraday bucket collectors.

The energy filter 35 comprises two outer electrodes 38, 39 and an inner electrode 40 which are shaped to provide two separate cylindrical annular channels through which the beams 29 and 30 respectively travel. As in the FIG. 1 embodiment the sector angles, radius and image and object distances of each part of the analyzer are selected to focus the beam passing through it into the appropriate collector electrode. In practice it is not necessary to achieve very accurate focusing because the energy loss associated with the unwanted scattered ions from the major beam 28 is typically quite large and the energy filtering does not need to be very sharp in order to reject them. Consequently, the outer electrodes 35 and 39 may be of the same radius to facilitate construction.

The signals from the three collectors 34, 36 and 37 are fed to separate amplifiers 41, 42 and 43 and digital computer 24 is programmed to calculate the appropriate isotopic ratios from the three signals for mass-to-charge ratios 44, 45 and 46 as in a conventional mass spectrometer.

The provision of energy filtration of the minor isotopic beams substantially eliminates interference with the signals from their detectors due to ions in the major beam at mass-to-charge ratio 44 which have lost energy through collisions, and greatly improves the abundance sensitivity of the spectrometer.

What is claimed is:

1. An isotopic-ratio multiple-collector mass spectrometer comprising:

a) an ionization source for generating from a sample ions having an initial kinetic energy;

b) a magnetic sector analyzer that disperses said ions according to their momentum into a plurality of ion beams each of which substantially comprises ions of a different mass-to-charge ratio, and focuses each of said beams to different position in a focal plane, wherein in use said plurality of beams comprises at least a first ion beam and a second ion beam that is more intensive than said first ion beam;

c) first ion detection means disposed in said focal plane to receive ions of a first mass-to-charge ratio comprised in said first ion beam;

d) second ion detection means disposed in said focal plane to receive ions of a second mass-to-charge ratio comprised in another of said plurality of ion beams, other than said first ion beam; and e) means for determining from signals generated by said first and said second ion detection means the ratio of the number of ions having said first mass-to-charge ratio to the number of ions having said second mass-to-charge ratio;

said mass spectrometer characterized in that said first ion detection means comprises an ion-energy filter that allows only ions having substantially said initial kinetic energy to pass to a collection electrode and thereby to generate said signal from said first ion detection means.

2. A mass spectrometer as claimed in claim 1 wherein a beam stop is provided in the path of said second ion beam to discharge ions comprised in it.

3. An isotopic ratio mass spectrometer as claimed in claim 1 wherein said first ion detection means is disposed to receive ions having said initial kinetic energy and a mass-to-charge ratio of 3, said second ion detection means is disposed to receive ions having said initial kinetic energy and a mass-to-charge ratio of 2, and said second ion beam comprises ions having a mass-to-charge ratio of 4.

4. A mass spectrometer as claimed in claim 3 adapted for the determination of hydrogen isotopic ratios in the presence of helium.

5. A mass spectrometer as claimed in claim 4 further comprising a continuous flow inlet system that generates from a sample to be analyzed and for delivery to said ionization source, a flow of $H_2$, HD and $D_2$ in a helium carrier gas.

6. A mass spectrometer as claimed in claim 1, wherein a further ion detection means comprising an ion energy filter in addition to said first ion detection means is provided, disposed to receive another of said plurality of ion beams other than said first ion beam.

7. A mass spectrometer as claimed in claim 6 adapted for the determination of carbon isotopic ratios wherein said first ion detection means is disposed to receive ions having said initial kinetic energy and a mass-to-charge ratio of 45, said further ion detection means is disposed to receive ions having said initial kinetic energy and a mass-to-charge ratio of 46, and said second ion detection means is disposed to receive ions having a mass-to-charge ratio of 44.

8. A mass spectrometer as claimed in claim 1 wherein said ion-energy filter comprises a cylindrical sector analyzer that focuses ions having said initial kinetic energy into a collection electrode.

9. A mass spectrometer as claimed in claim 1 wherein said collection electrode is a Faraday bucket collector electrode.

10. A method of determining isotopic composition using a multiple-collector mass spectrometer comprising the steps of:

a) generating from a sample ions which have an initial kinetic energy;

b) dispersing said ions according to their momentum by means of a magnetic sector analyzer, thereby producing a plurality of ion beams each of which substantially comprises ions of a different mass-to-charge ratio, and focusing each of said plurality of ion beams to a different position in a focal plane, wherein in use said plurality of ion beams comprises at least a first ion beam and a second ion beam that is more intense than said first ion beam;

c) receiving ions comprised in said first ion beam that have a first mass-to-charge ratio in first ion detection means disposed in said focal plane;

d) receiving ions comprised in another of said plurality of ion beams other than said first ion beam that have a second mass-to-charge ratio in second ion detection means disposed in said focal plane; and e) determining from signals generated by said first and second ion detection means the ratio of the number of ions having said first mass-to-charge ratio to the number of ions having said second mass-to-charge ratio;

said method characterized by the additional step of energy filtering the ions after they have entered said first ion detection means to allow only ions having said initial kinetic energy to reach a collection electrode and generate said signal from said first ion detection means.

11. A method as claimed in claim 10 wherein said second ion beam is intercepted by a beam stop placed in its path.

12. A method as claimed in claim 10 wherein said first ion detection means is disposed to receive ions having said initial kinetic energy and a mass-to-charge ratio of 3 and said second ion detection means is disposed to receive ions having said initial kinetic energy and a mass-to-charge ratio of 2, and wherein in use said second ion beam comprises ions having a mass-to-charge ratio of 4.

13. A method as claimed in claim 12 of determining hydrogen isotopic ratios in the presence of helium.

14. A method as claimed in claim 13 wherein hydrogen isotopes present in a sample are converted to $H_2$, HD and $D_2$ in a flow of helium gas by a continuous flow inlet system prior to the generation of said ions.

15. A method as claimed in claim 10 wherein ions arriving at one or more further ion detection means (other than said first ion detection means) are energy filtered.

16. A method as claimed in claim 15 for the determination of carbon isotopic ratios wherein said first ion detection means is disposed to receive ions having said initial kinetic energy and a mass-to-charge ratio of 45, a said further ion detection means is disposed to receive ions having said initial kinetic energy and a mass-to-charge ratio of 46, and said second ion detection means is disposed to receive ions having a mass-to-charge ratio of 44.

17. A method as claimed in claim 10 wherein said energy filtering is carried out by a cylindrical sector analyzer which focuses ions having said initial kinetic energy into a collector electrode.

18. A method as claimed in claim 17 wherein said collector electrode is a Faraday bucket collector electrode.

* * * * *